United States Patent [19]
Dietrich, Sr. et al.

[11] Patent Number: 5,865,131
[45] Date of Patent: Feb. 2, 1999

[54] SLURRY FERTILIZER APPLICATOR

[75] Inventors: William J. Dietrich, Sr., Congerville; Aaron L. Beyer, Roanoke, both of Ill.

[73] Assignee: DMI, Inc., Goodfield, Ill.

[21] Appl. No.: 816,865

[22] Filed: Mar. 13, 1997

Related U.S. Application Data

[60] Provisional application No. 60/013,314 Mar. 13, 1996.

[51] Int. Cl.$^6$ ..................................................... A01C 23/02
[52] U.S. Cl. ............................................. 111/121; 111/124
[58] Field of Search ..................................... 111/118, 124, 111/123, 152, 156, 167, 121

[56] References Cited

U.S. PATENT DOCUMENTS

| 4,377,979 | 3/1983 | Peterson . | |
|---|---|---|---|
| 4,592,294 | 6/1986 | Dietrich, Sr. et al. . | |
| 4,834,189 | 5/1989 | Peterson . | |
| 5,357,883 | 10/1994 | Depault | 111/118 |
| 5,566,627 | 10/1996 | Pryor | 111/118 |

FOREIGN PATENT DOCUMENTS 2118411  11/1983  United Kingdom .

OTHER PUBLICATIONS

Kaweco Sleepvoetenbemester Brochure (2 pages), Author Unknown.
Nuhn Industries Ltd. brochure (4 pgs.), date unknown.
Top Air Manufacturing, Inc. brochure "Liquid Manure Injectors" date unknown.
"Farm Industry News" magazine article Manure tools take on residue, Mar., 1996, pp. 50–55.
"Performance of Manure Injection Systems" by Wayne Block, Extension Educator, Farm Systems (3 pgs.), date unknown.

*Primary Examiner*—Terry Lee Melius
*Assistant Examiner*—Christopher J. Novosad
*Attorney, Agent, or Firm*—Emrich & Dithmar

[57] ABSTRACT

A spring-cushioned coulter running ahead of the applicator for cutting an initial slot in any residue and for providing a break line for the soil to be parted by the trailing shank. The trailing shank, in turn, spreads the initial slot, and deepens it, for the entry of a slurry delivery tube welded behind the shank. At the bottom of the shank is a shoe having a pair of side wings. A downward and outward slope of the wings creates a flat, peaked soil profile ("sole") beneath the wings having sides which slope downwardly and outwardly, conforming to the shape of the wings. The lift surfaces of the wings slightly raise the soil laterally of the shank from the center toward the ends of the wings to provide slots or fissures above the sloped edges of the sole, permitting, and promoting the lateral distribution of the slurry.

17 Claims, 11 Drawing Sheets

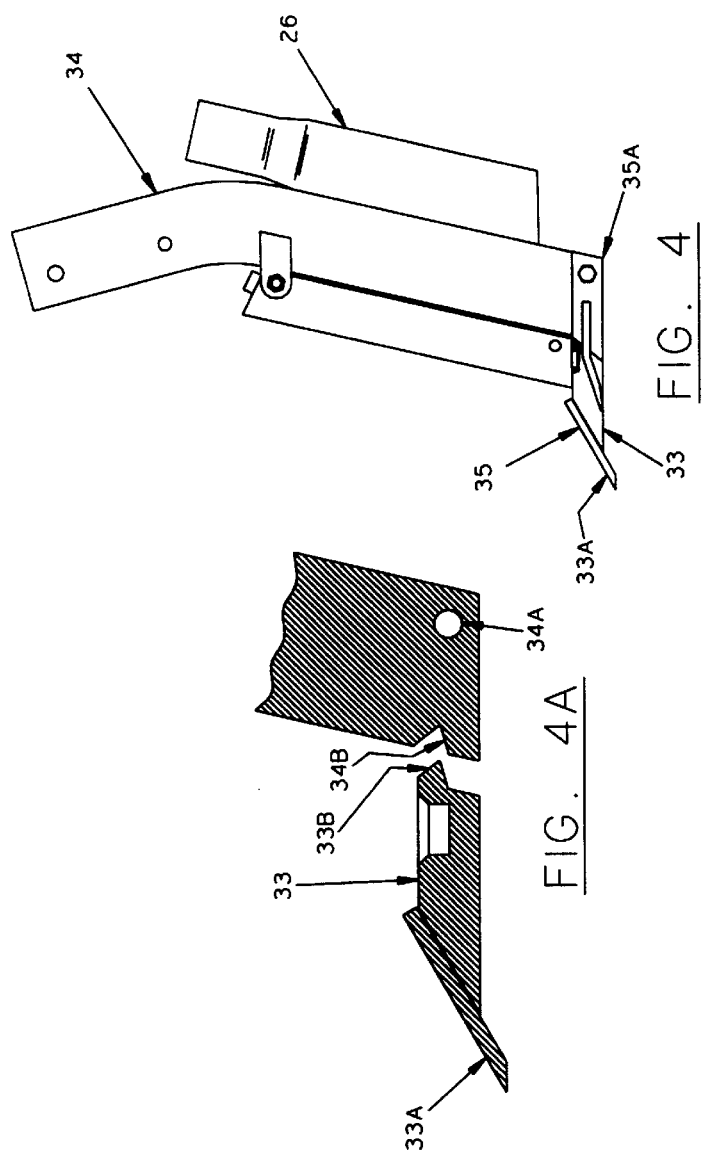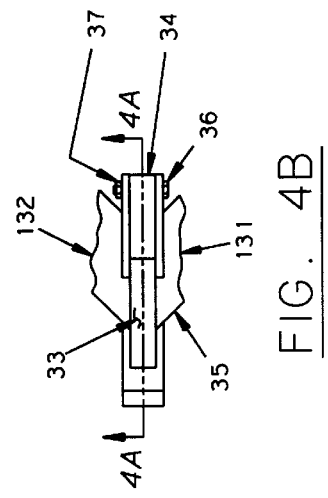

SLURRY FERTILIZER APPLICATOR

RELATED APPLICATION

This application claims the benefit of the filing date of copending U.S. Provisional Application No. 60/013,314, filed Mar. 13, 1996.

BACKGROUND OF THE INVENTION

Field of the Invention

The present invention relates to agricultural fertilizer applicators; and more particularly, it relates to apparatus for subsoil application of livestock waste in the form of a slurry (that is, a freely flowable mixture of liquids and solids).

Background of the Invention

Historically, livestock waste, particularly in solid form, has been spread on the surface of the soil by a manure spreader using a flail to fling the material to the rear. A more modern side-discharge spreader also discharges the material on the surface of the soil.

The advent of confinement systems for animals which include pits below the confinement area, produces a large amount of animal waste which must be handled and disposed of in a slurry form. Typically, the slurry is pumped into a large tank carried by a wagon, but it is still, for the most part, spread or sprayed on the surface of the soil.

This procedure has, as a principle objection, a strong odor which resides after the waste is spread. More-over, surface-spreading of animal waste creates a hazard with the potential runoff of nitrates into rivers and streams or seeping of the material into ground water. This is objectionable because livestock waste is high in nitrogen, and with increasing concern with the quality of drinking water, this procedure is becoming less and less acceptable.

Various methods have been proposed for depositing the slurry underground. One method is to use a fertilizer knife, such as shown in U.S. Pat. No. 4,592,294, and to weld a large pipe to the rear of the knife to deliver the slurry behind the knife and into the slot cut in the soil by the knife. This leaves a very narrow band of fertilizer having a high concentration of nitrogen.

Another method of subsoil delivery of animal waste employs a standard chisel plow shank with an attached wide cultivator sweep, in an attempt to distribute the slurry further laterally and to avoid the concentration which occurs in the case of a simple fertilizer knife, described above.

This method, however, has not fully overcome the concentration problem, and it presents still another problem—namely, the cultivator sweep unnecessarily tills the soil and may result in burying surface residue. This may be a separate problem, particularly for farmers whose land may have been designated HEL, because there are federal requirements to maintain a certain percentage of crop residue on the surface soil. Both the chisel plow shank (which is a wide shank) and cultivator sweeps are designed to create a plowing action that mixes the soil with the residue, buries a large percentage of the residue, and leaves a furrow behind the shank.

SUMMARY OF THE INVENTION

The present invention employs a spring-cushioned coulter running ahead of the applicator for cutting an initial slot in any residue and for providing a break line for the soil to be parted by the trailing shank. The trailing shank, in turn, spreads the initial slot, and deepens it, for the entry of a slurry delivery tube welded behind the shank.

A fin with a vertical parting edge is mounted in front of a narrow shank for gently parting the soil in the slot formed by the coulter and for extending the slot beneath the level of the coulter.

At the bottom of the shank is a shoe having a pair of side wings. Each wing has a leading cutting edge and a lift surface. The shoe extends in front of the shank as well as behind the shank adjacent the delivery tube. A downward and outward slope of the wings creates a flat, peaked soil profile ("sole") beneath the wings having sides which slope downwardly and outwardly, conforming to the shape of the wings.

The slurry is deposited at the center, top of the sole, and the resulting splashing action and the sides of the soil profile of the unworked soil distribute the slurry downwardly and outwardly. The lift surfaces of the wings slightly raise the soil laterally of the shank from the center toward the ends of the wings to provide slots or fissures above the sloped edges of the sole, permitting, and promoting the lateral distribution of the slurry.

The improved applicator thus extends the lateral distribution of the slurry, thereby reducing high concentrations of slurry, and extends the area in which the fertilizer is available as a nutrient for plants. At the same time, the surface of the soil and any residue are left substantially undisturbed. Means may be provided for closing the narrow furrow left by the shank, but the furrow is small and narrow when the shank has a narrow width, as is preferred.

The invention consists of certain novel features and a combination of elements hereinafter fully described and illustrated in the accompanying drawings, it being understood that various changes in the details may be made without departing from the spirit, or sacrificing any of the advantages of the present invention.

BRIEF DESCRIPTION OF THE DRAWING

For the purpose of facilitating an understanding of the invention, there is illustrated in the accompanying drawing a preferred embodiment thereof, from an inspection of which, when considered in connection with the following description, the invention, its construction and operation, and many of its advantages should be readily understood and appreciated.

FIG. 4 is a left side view of a modified shank assembly showing the construction of a bolt-on point assembly;

FIG. 4A is a vertical cross view taken along the sight line 4A—4A of FIG. 4 of the lower portion of the shank and the point assembly in exploded relation;

FIG. 4B is a bottom view of the assembly of FIG. 4;

DETAILED DESCRIPTION OF THE PREFERRED EMBODIMENTS

Figure 1:
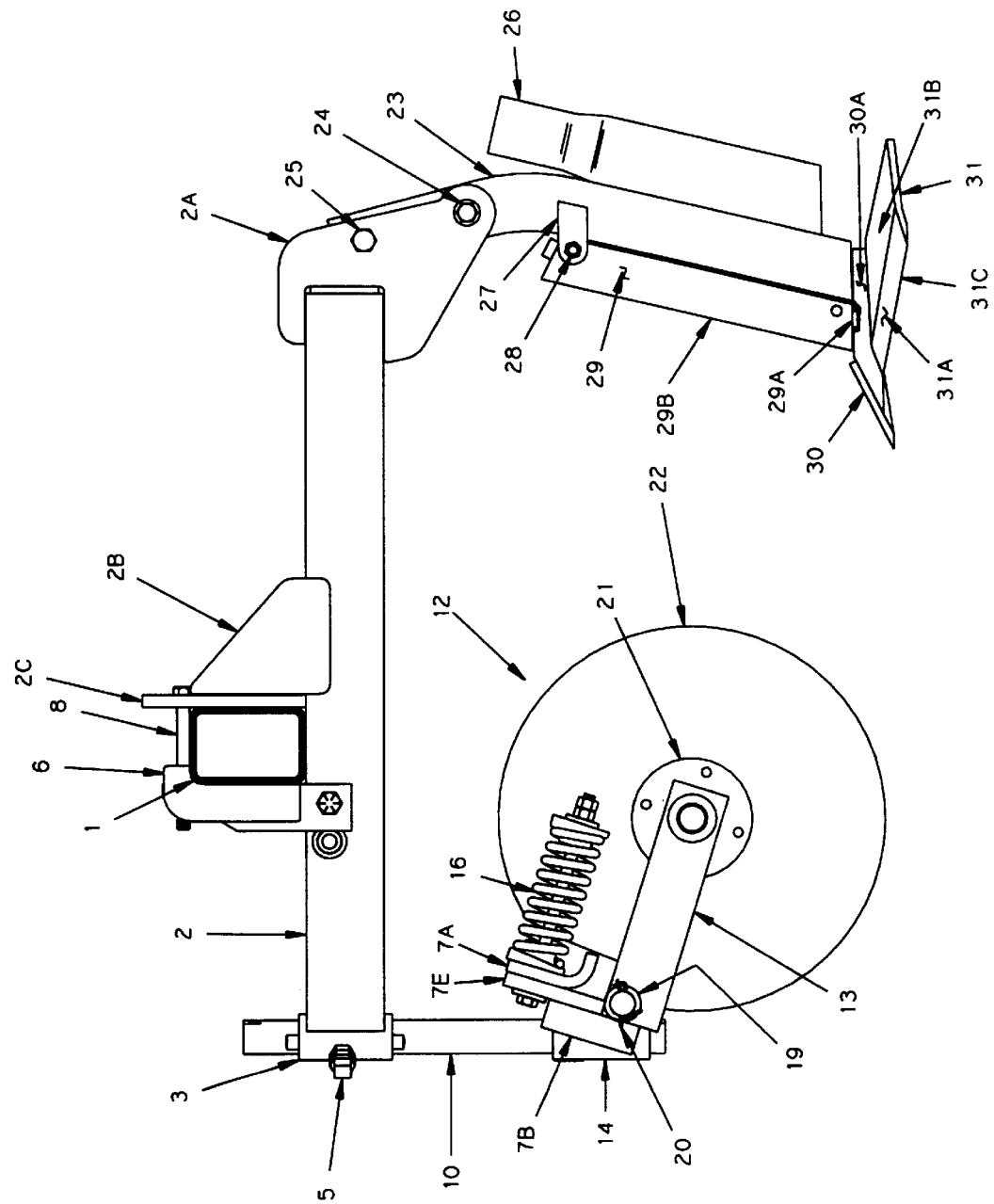
FIG. 1 is a side view of a first embodiment of an improved slurry applicator constructed according to the invention.

Referring first to FIG. 1, reference numeral 1 generally designates a toolbar or tubular mounting frame mounted to the rear end of a wagon carrying a tank of slurry. Hosing pumps and other apparatus for delivering the slurry to the applicator is not shown because it is conventional.

A single unit is shown in the drawing. A person skilled in the art will readily realize that a number of such units can be located in spaced relation, side by side, along the tool bar 1, and at any lateral spacing desired by the farmer.

The unit includes a mount beam 2 extending in the fore-and-aft direction and mounted to the toolbar 1 by means of gussets 2B. The gussets 2B are welded to the mount beam 2 and to a plate 2C located behind the rear surface of the toolbar 1. A clamp 6 and bolts 8 secure the unit to the toolbar by means of plate 8. Bolts 8 secure the clamp 6 and the mount beam to the toolbar-1, while permitting it to be removed or be adjusted laterally.

At the front end of the mount beam 2 forward of the toolbar, there is mounted a collar 3 for receiving a vertical coulter shaft 10 on which a coulter assembly 12 is mounted. A set screw and jam nut 5 clamps the collar 3 to the shaft 10 in a vertically adjusted position.

A coulter blade 22 is mounted to a hub 21 which, in turn, is mounted to a rearwardly extending arm 13. The arm 13 is pivotally mounted to shaft 10 by means of bushings 19 journaled on a cross shaft 20, permitting the arm 13 to rotate about shaft 20 in a vertical plane. Shaft 20 is mounted to a pivot collar 14 carried on the mount shaft 10.

A bracket 7A is welded to a bracket 7B, which is welded to the collar 14 and it limits the rearward motion of a plate 7E which is welded to the coulter arm 13 and bushing 19. A conventional compression spring 16 and spring bolt are mounted to urge the plate 7E against the stop bracket 7A, thereby urging the coulter 22 downward into the use position while cushioning it and permitting the coulter to raise and ride over obstacles. The spring 16 may be preloaded to provide a predetermined initial downward force on the coulter blade 22. The coulter blade 22 forms a slot in the soil to a depth of 3–4 in. and cuts any residue in front of the applicator shank, as will be appreciated from subsequent description.

Turning now to the rear portion of the mount beam 2, a pair of adapter plates 2A are mounted to the rear of the mount beam 2. A shank 23 is mounted by bolts 24, 25 received in apertures in the adapter plates 2A. The position of the shank may be adjusted vertically by providing a series of apertures in the adapter plates 2A. The shank 23 extends, in its operating portion, downwardly and slightly forwardly.

A V-shaped casting 29 (sometimes referred to as a shin wedge) having a leading edge 29B is mounted to the front edge of the shank 23 by means of mounting tabs 27 which are welded to the sides of the shank 23, and a bolt 28. The bottom of the shin wedge 29 includes a foot 29A which is received in a recess formed on the top of a weldment 30A referred to as a "shoe" or "frog", thereby securing the shin wedge 29 to the shank 23.

Figure 2:
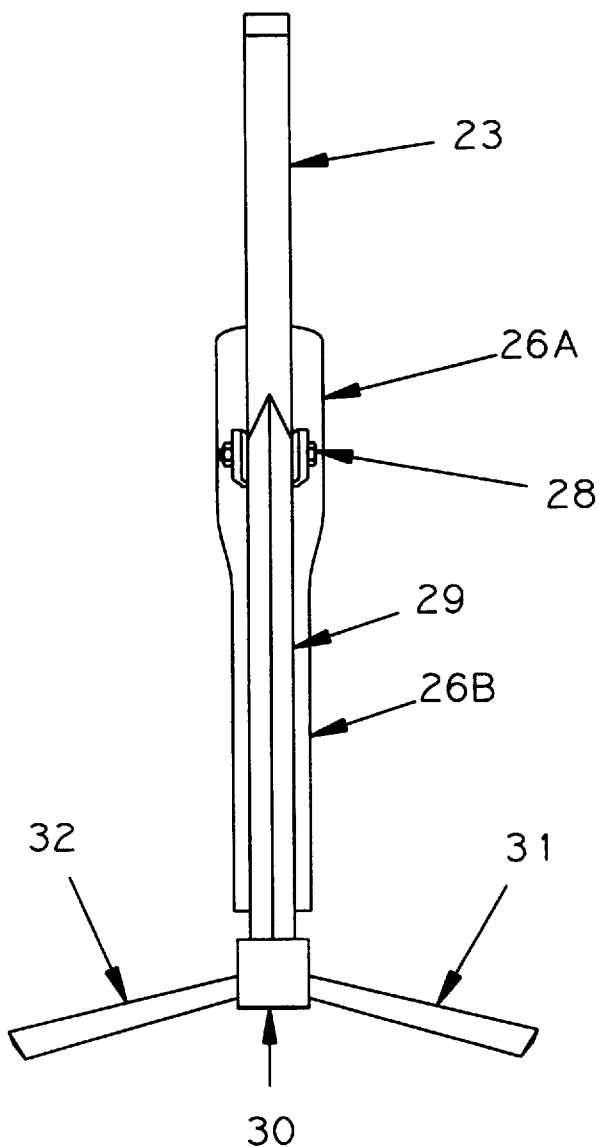
FIG. 2 is a front view of the shank assembly of the apparatus of FIG. 1.
Figure 3:
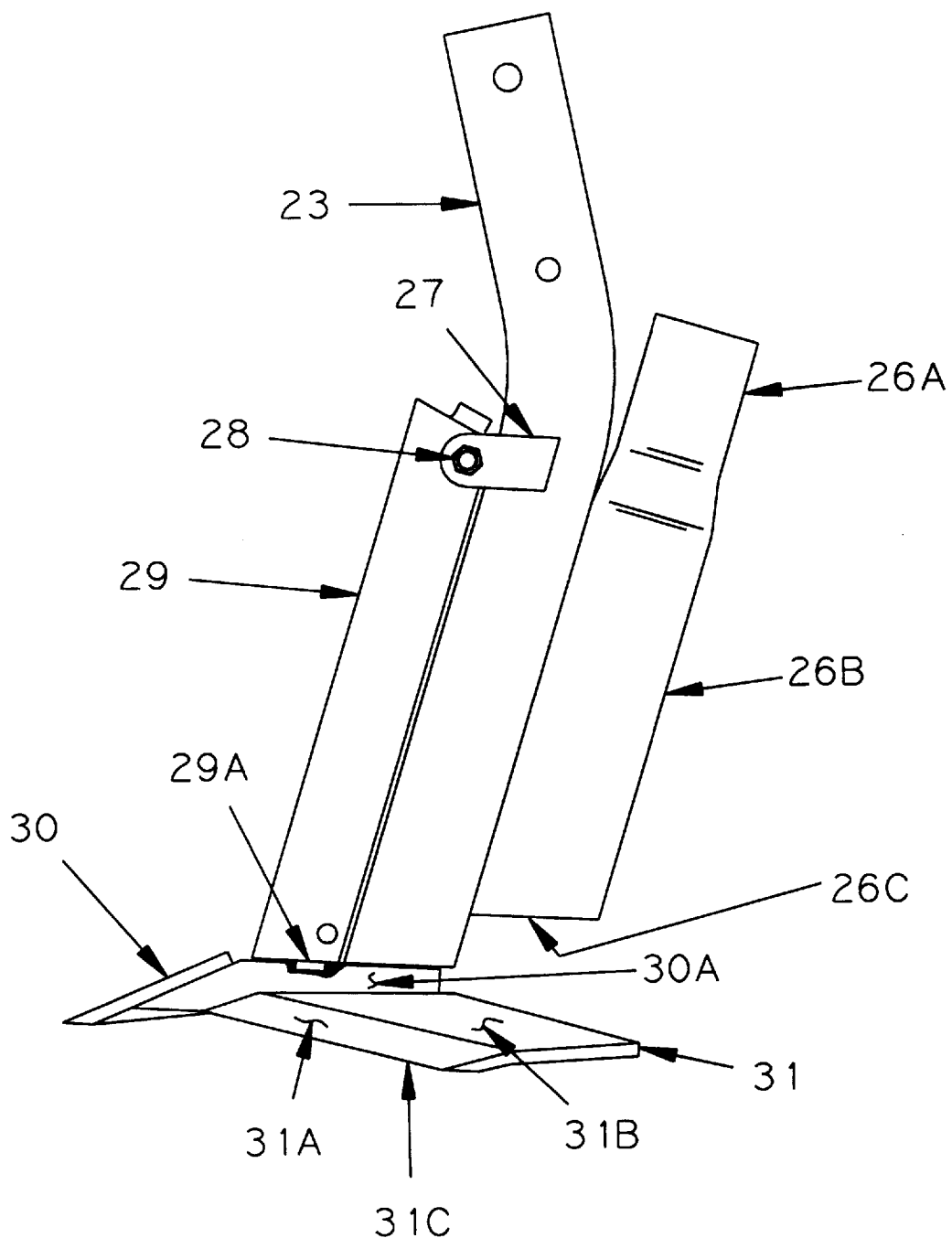
FIG. 3 is a left side view of the shank assembly of FIG. 2.

As best seen in FIG. 2, which is a front view, the shin wedge 29 has a right and a left surface which are inclined forwardly and towards the center to provide the vertical leading edge 29B. The leading edge 29B follows in the slot formed by the coulter 22, and the shin wedge 29 gently parts the soil substantially the entire length of the slot to a width approximately equal to the width of the shank 23. As can be seen in FIG. 2, the width of the rear portion of the shin wedge 29 is approximately as wide as the width of the shank 23. A slurry delivery tube 26 is mounted behind the shank 23. The delivery tube 26 includes a cylindrical upper portion 26A and a lower portion of reduced width, 26B. In the embodiment of FIGS. 1–3, the width of the lower, flattened section 26B of the slurry tube 26 is slightly wider than the rear portion of the shin wedge 29. Preferably, the lower portion 26B of the delivery tube is only wide enough to ensure there is no plugging in the tube so the width may depend on the intended application. These relationships are not critical, however.

A plate or shoe 30A is welded to the bottom of the shank 23, and extends forwardly, beneath the shin wedge 29. The shoe 30A provides a recess for receiving the projection 29A at the bottom of the shin wedge. The forward portion of the shoe 30A is inclined downwardly and forwardly, as best seen in FIG. 3. A point 30 is welded to the forward, tapered portion of the shoe 30A, and as seen in FIG. 1, the point 30 provides an upwardly and rearwardly inclined surface for engaging the soil immediately behind the coulter 22 for raising the soil slightly. On either side of the point 30, and forming integral components of the shoe are left and right wings 31, 32.

As best seen in FIG. 3, for the wing 31 (which is a mirror image of the right wing 32), it includes a cutting edge 31C from which a lift surface 31A extends upwardly and rearwardly. A flat rear portion 31B is elevated above the leading cutting edge. The wings extend downwardly proceeding laterally of the shank, as seen in FIG. 2, and rearwardly as seen in FIG. 1. As seen in FIG. 2, the profile of the sole formed by the working portion of the shank assembly is such that it has a flat top or peak defined by the lower edge of the point 30, and outwardly and downwardly sloped side walls.

The flat, inboard edges of the wings 31, 32 abut the opposing sides of the shoe 30A and are welded to it. The flat portions of the wings (31B for wing 31) also extend downward proceeding away from the shank. The rear portions of the flat sections of the wings are spaced apart slightly to receive the slurry delivery tube 26. The slurry is delivered to the tube 26 by conventional means currently in use. The lower portion of the slurry delivery tube is designated 26B and has its sidewalls flattened, like a vacuum cleaner suction nozzle, as described above. The purpose of this flattening is to reduce lateral soil movement caused by the tube, so that it can sit behind the shank 23 without creating additional surface disturbance, and to permit the discharge orifice of the tube to be located between, but slightly above, the wings 31, 32 (see FIG. 3). Thus, splashing does not occur except near the bottom of the trough formed by the shoe, and without substantially decreasing the cross section of the slurry delivery tube. Yet, the slurry is available in quantity at the peak of the sole of the furrow formed by the shank assembly, so that it can immediately move into the sloped fissures formed by the wings.

That is, when the slurry is deposited on the peak of the sole (that is, the upper surface of the unworked soil), it splashes or runs laterally outwardly and, under gravity assistance, down into the slots or fissures formed in the soil profile by the shoe. Some of this lateral movement of the slurry is believed to occur before the soil raised by the wing falls back down onto the sole, but even if the soil does fall back down, it is broken up, and distribution of the slurry to the sides is promoted.

As can be seen in FIG. 1, the rear, flat portion 31B of the wing 31 is raised slightly above the leading cutting edge of the wing. This forms a lateral fissure in the soil and facilitates the outward flow of the slurry. The outward flow of the slurry is further promoted, as mentioned, by the shape of the profile of the sole of the soil left untilled—that is, the side surfaces of the untilled soil extended downwardly and outwardly in accordance with the profile of the wings as seen in FIG. 2. Moreover, the wings in combination form a swept-back configuration, as compared with a delta wing or triangle. By envisioning the swept-back wing configuration passing through a vertical plane transverse of the direction of travel, it can be appreciated that the raised portion of soil progress laterally outwardly of the shank as the wings move forward. This further promotes outward flow of slurry from the location of deposit from the delivery tube.

Referring to FIGS. 4, 4A and 4B, there is shown a modification of the embodiment of FIGS. 1–3 wherein the point assembly is bolted on to the shank 34 which is provided with a bolt-receiving aperture 34A and a notch 34B on the front side.

The point assembly 35 includes a bar 33 with an inclined forward surface for mounting the point plate 33A, and a projection 33B received in the notch 34B of the shank.

A pair of side mounting plates 35A are welded to the side of the bar 33 and extend rearwardly to form a receptacle for receiving the bottom of the shank. Plates 35A have apertures which align with the aperture 34A of the shank when the point assembly is mounted to the shank by bolt 36 and nut 37. The wings 131 and 132 are similar to the previously described wings 31, 32 except they are welded to the bar 33 and outboard surfaces of the plates 35A as best seen in FIG. 4B.

If it is desired, the embodiment of FIGS. 1–3, or as modified by FIGS. 4, 4A and 4B, might be further modified to include any of the three trailing devices, as described below, for firming or compacting the soil behind the shank, or for mounding the soil or form leveling it, according to the desires of the farmer.

Figure 5:
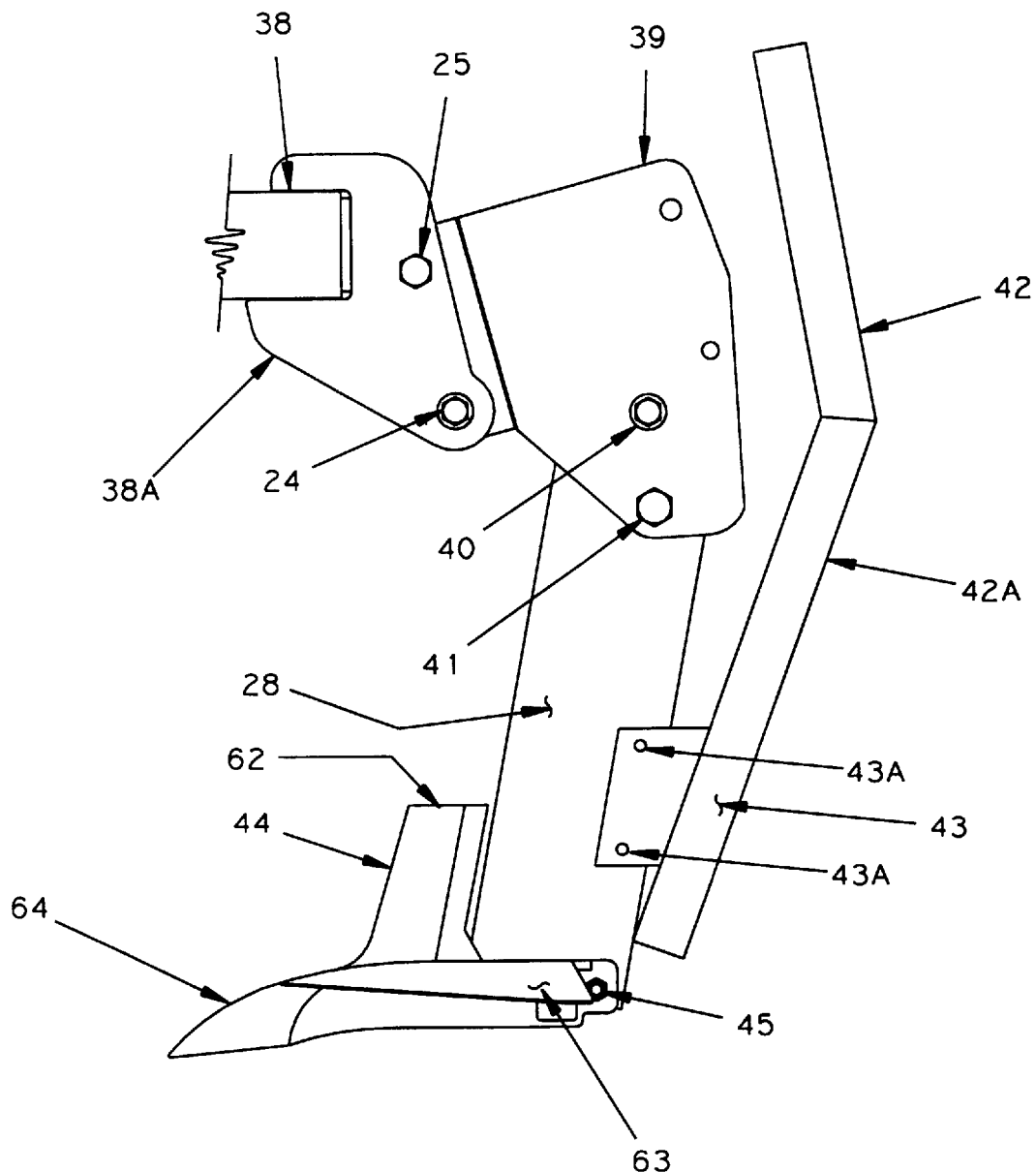
FIG. 5 is a left side view of an alternative embodiment of a slurry applicator shank assembly.

Turning now to FIG. 5, there is shown an embodiment of a slurry applicator which is suitable for use in pastures without damage to the crop or when the farmer employs no-till procedures. A mounting beam, seen partially at 38 (which may also include a coulter as described above), is mounted to a toolbar as disclosed above, and includes mounting plates, one of which is shown at 38A. An adapter 39 for a no-till shank is bolted at 24, 25 to the mounting plates 38A. The shank 28 is bolted at 40, 41 to the adapter. A winged point 44, constructed using the techniques of FIGS. 4, 4A and 4B is assembled and bolted at 45 to the bottom of the shank 28.

The winged point 44 includes a shorter shin fin or wedge 62, wings 63, and a point 64.

A slurry delivery tube 42 is mounted by tabs 43 and pins 43A to the rear of the shank. The delivery tube 42 extends downwardly and slightly forwardly in a lower section 42A to provide a slight forward momentum to the slurry delivered in the wake of the shank and, again, slightly above the bottom of the shank and behind the wings but centered relative to the wings.

Figure 6:
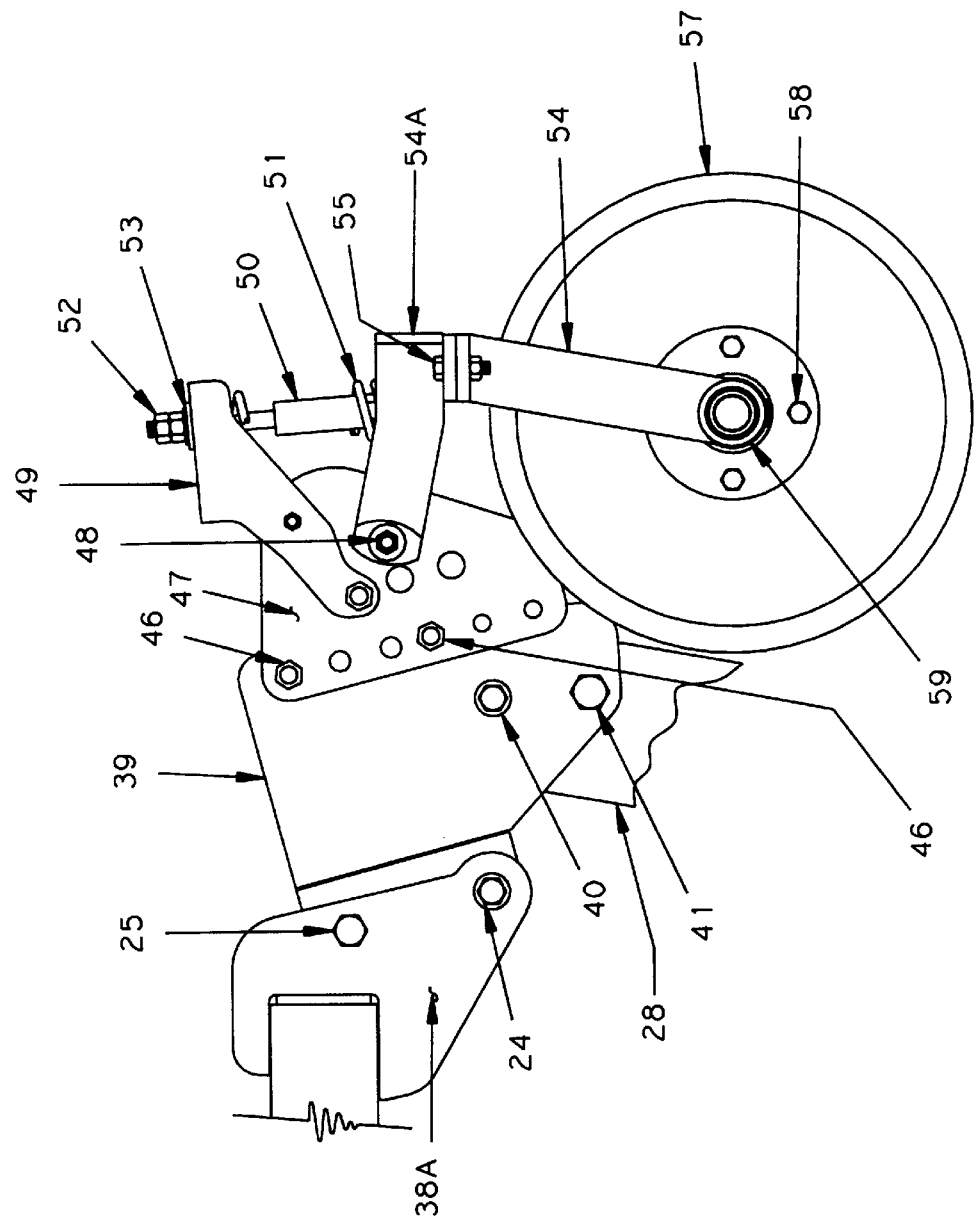
FIG. 6 is a right side view of the disc blade assembly with the shank assembly removed.

FIG. 6 shows one alternative sealer arrangement for closing or firming the soil behind the applicator, using discs. As used herein, "coulter" refers to a flat circular blade used for cutting or forming a slot; and "disc" refers to a dished or concave blade.

A pair of mounting plates 47 are bolted at 46 to the rear of the adapter plate 39. A mounting arm 54A is pivotally mounted by means of a bolt 48 to the mounting plates 47. A pair of arms, one of which is seen at 54, are bolted at 55 to the mounting arms 54A. Disc blades 57 are bolted at 58 to hubs 59 carried by the arms 54.

A spring mount bracket 49 is mounted to the plate 47. A compression spring 51 received on tube 50 is mounted by a spring bolt and nuts 52 and washer 53 to the bracket 49. The other end of the spring assembly is mounted to the support arm 54A. The spring assembly cushions and urges the sealer into contact with the soil.

Figure 7:
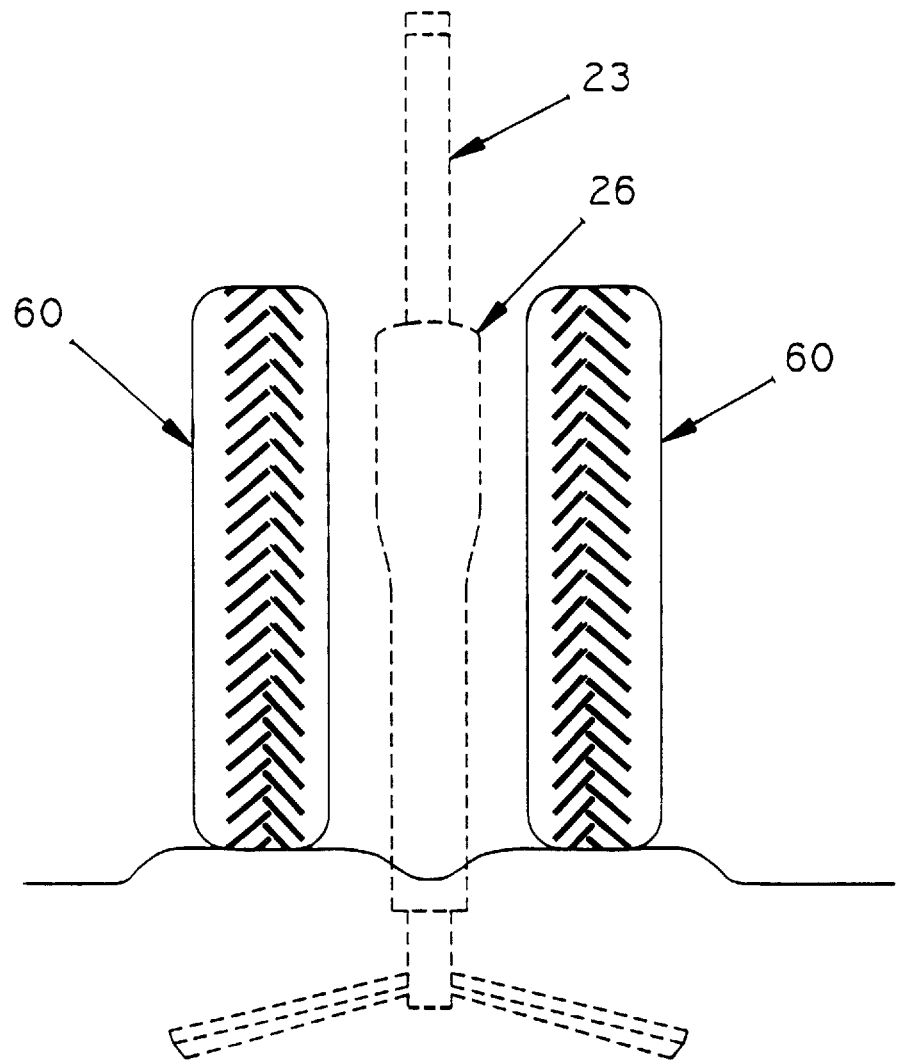
FIG. 7 is a rear view of an applicator using wheels for forming the soil, with the shank assembly shown in dashed line.

Three versions of sealer/closing mechanisms are shown in FIGS. 7–11. In FIG. 7, a pair of tires 60 may be mounted to the arms 54 and spaced to respective sides of the delivery tube 26 (of FIG. 1) or 42 (FIG. 5). In this case, the tires slightly compact and firm the soil raised and loosened by the wings, and slightly behind the wings of the point assembly.

Figure 8:
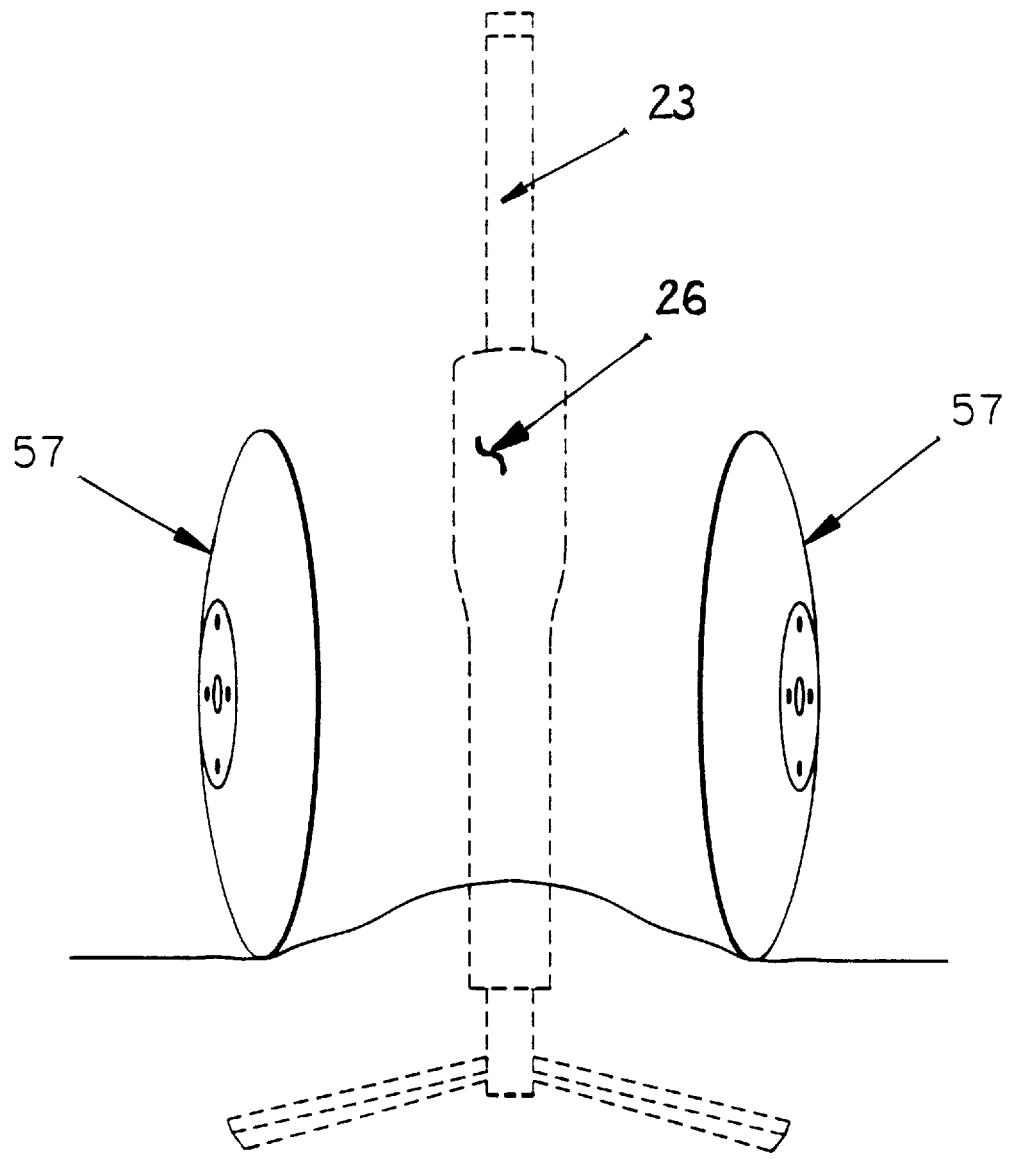
FIG. 8 is a view similar to FIG. 7 with inwardly facing discs used to ridge the soil behind the shank.
Figure 9:
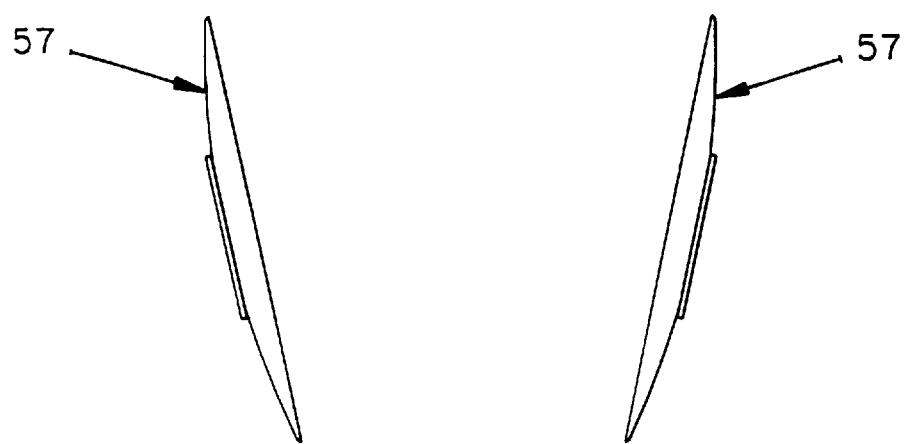
FIG. 9 is a top view of the shank assembly and discs of FIG. 8.

In FIGS. 8 and 9, the discs 57 are mounted with the concave surfaces in opposing relation, and with the front of the discs spaced further apart. This causes the discs to gather the loosened, raised soil and mound it behind the shank.

Figure 10:
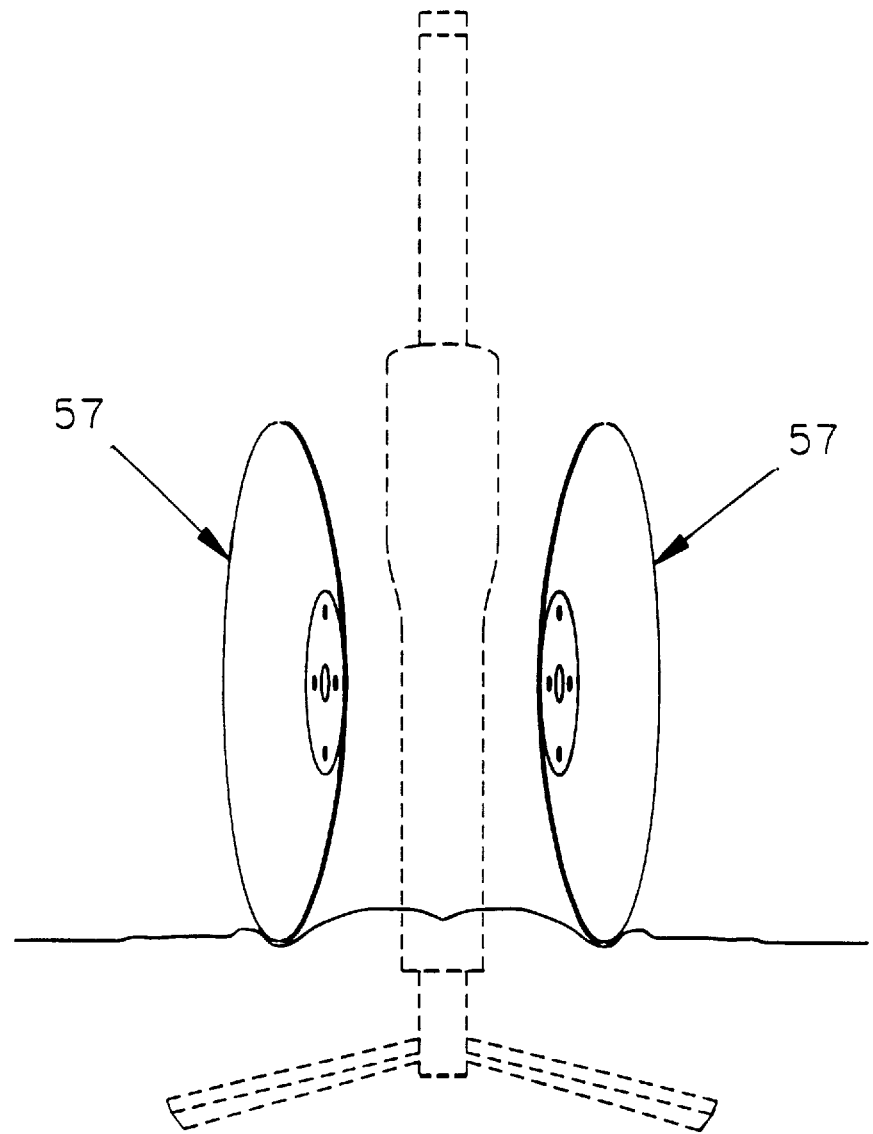
FIG. 10 is a rear view similar to FIG. 8 but with the discs facing outwardly.
Figure 11:
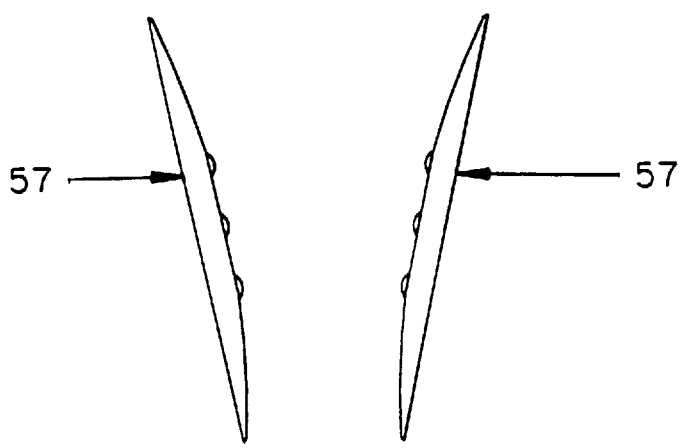
FIG. 11 is a top view of the shank assembly and discs of FIG. 10.

In FIGS. 10 and 11, the discs 57 are mounted with the convex surfaces in opposing relation, and with the front of the discs again, spread slightly more apart than the rear ends. This arrangement will reduce the ridge behind the applicator and will leave a more even surface profile of the soil, as seen in FIG. 10.

By way of further example, the wings may raise the soil a small amount, approximately one inch. The lateral extension of the wings promote dispersion of the slurry, but do not create any substantial boiling or tillage of the soil, thus, the span of the wings, from outer edge to outer edge may be in the range of 10–20 inches.

If it is desired to firm the soil behind the slurry tube, a blade assembly including a pair of disc blades, as shown and described in alternative arrangements, or a dual wheel assembly may be used. In such cases, a cushion spring is or may be used to urge the closer/sealer into ground engagement.

The delivery of the slurry onto the top of the inverted chevron profile of the sole left beneath the wings, promotes the lateral movement of the slurry, as explained above. This not only prevents concentration of the fertilizer directly beneath the slot, but it also permits the fertilizer to extend outwardly for more useful application for the crop. That is, the fertilizer becomes more readily accessible to the crop. Finally, the apparatus is useful for conventional farming practices as well as for medium residue or high residue (no-till) practices. In the case where it is even more desirable to reduce the disturbance of surface residue, the wheels of FIG. 7 can be placed to run on the top of the surface immediately above the flat portions of the wings of FIGS. 1–3 so as to eliminate any "boiling" or displacement of the residue or soil at the surface.

Having thus disclosed in detail a preferred embodiment of the invention, persons skilled in the art will be able to modify certain of the structure which has been illustrated and to substitute equivalent elements for those disclosed while continuing to practice the principle of the invention; and it is, therefore, intended that all such modifications and substitutions be covered as they are embraced within the spirit and scope of the appended claims.

We claim:

1. In an agricultural slurry applicator having a frame, the combination comprising:

a coulter mounted to said frame to part the soil and form a slot;

a shank assembly adapted to be mounted to said frame behind said coulter and comprising:

a shank for forming a slot in the soil behind said coulter;

a shin wedge mounted in front of said shank and having a vertical leading edge following in the slot formed by said coulter to widen said slot to a width approximately equal to the width of said shank;

a point mounted to the bottom of said shank and extending forwardly thereof;

first and second wings mounted behind said point and respectively on either side of said shank each wing having a cutting edge extending outwardly and rearwardly relative to said point, said point and wings cooperating to break the soil in front of said shank and to lift the soil along paths defined by said wings to form fissures without substantial tillage of the soil; and a slurry delivery tube mounted to said shank and extending downwardly in the slot formed by said shank, said delivery tube defining a discharge opening to place slurry immediately behind said shank and adjacent the inboard ends of said fissures formed by said wings, whereby said slurry moves outwardly in said fissures as they are formed by said wings and the soil raised by said wings is free to fall after said wings have passed and said slurry has been placed.

2. The apparatus of claim 1 wherein each of said wings defines a forward cutting edge extending laterally of said shank and downwardly thereof to form a sole in said soil of inverted chevron form having side walls extending downwardly and away from the center of the slot formed by said shank further to promote lateral movement of said slurry.

3. The apparatus of claim 2 wherein said cutting edges of said wings are swept rearwardly from the location of attachment to said shank.

4. The apparatus of claim 2 wherein said wings have swept-back leading edges to widen progressively said fissures as said shank moves forwardly, and said wings have upper surfaces rearward of said leading edges to raise the soil.

5. The apparatus of claim 4 further comprising sealer means behind said shank to close the furrow left by said shank.

6. The apparatus of claim 5 wherein said sealer means comprises a pair of wheels, one on either side of said shank to firm the soil raised by said wings.

7. The apparatus of claim 6 wherein said wheels are located above said wings respectively to hold the soil and any residue in place as said shank passes.

8. The apparatus of claim 5 wherein said sealer means comprises a pair of discs, one on either side of said shank.

9. The apparatus of claim 8 wherein said discs have concave surfaces in opposing relation and have their leading edges spaced further apart than their rear edges to mound soil behind said shank.

10. The apparatus of claim 9 wherein said discs have convex surfaces in opposing relation and have their leading edges spaced closer together than their rear edges to level the soil behind said shank.

11. The apparatus of claim 1 wherein said shin wedge is mounted to said shank.

12. The apparatus of claim 1 wherein said point includes means for removeably mounting to said shank and including a rearward extension for coupling to a corresponding notch on the front of said shank.

13. The apparatus of claim 12 wherein said wedge is integrally formed with said point.

14. The apparatus of claim 13 wherein said shank is flat and has a width of approximately 1 to 1¼ in.

15. The apparatus of claim 1 wherein each of said wings has an outboard tip, and the lateral distance between said tips of said wings is at least as great as approximately ten inches.

16. In an agricultural slurry applicator having a frame, the combination comprising:

a coulter mounted to said frame to part the soil and form a slot;

a shank assembly adapted to be mounted to said frame and comprising:

a shank for forming a slot in the soil behind said coulter;

a shin wedge mounted in front of said shank and having a vertical leading edge following in the slot formed by said coulter to widen said slot to a width approximately equal to the width of said shank;

a point mounted to the bottom of said shank and extending forwardly thereof;

first and second wings mounted behind said point and respectively on either side of said shank, each wing having a cutting edge extending outwardly and rearwardly relative to said point, said wings sloping laterally downwardly from said shank and cooperating with said point to form a sole of unworked soil having a generally flat center portion and downwardly sloped outer portions, said point and wings cooperating to break the soil in front of said shank and to lift the soil along paths defined by said wings to form fissures without substantial tillage of the soil; and a slurry delivery tube mounted to said shank and extending downwardly in the slot formed by said shank, said delivery tube defining a discharge opening to place slurry immediately behind said shank and adjacent the inboard ends of said fissures formed by said wings, whereby said slurry moves outwardly in said fissures as they are formed by said wings and the soil raised by said wings is free to fall after said wings have passed and said slurry has been placed.

17. In an agricultural slurry applicator having a frame, the combination:

a coulter mounted to said frame to part the soil and form a slot;

a shank assembly adapted to be mounted to said frame and comprising:

a shank for forming a slot in the soil behind said coulter;

a shin wedge mounted in front of said shank and having a vertical leading edge following in the slot formed by said coulter to widen said slot to a width approximately equal to the width of said shank;

a point mounted to the bottom of said shank and extending forwardly thereof;

first and second wings mounted behind said point and respectively on either side of said shank, each wing having cutting a edge extending outwardly and rearwardly relative to said point, said point and wings cooperating to break the soil in front of said shank and to lift the soil along paths defined by said wings to form fissures without substantial tillage of the soil; and a slurry delivery tube mounted to said shank and extending downwardly in the slot formed by said shank, said delivery tube defining a discharge opening to place slurry immediately behind said shank and adjacent the inboard ends of said fissures formed by said wings, said discharge opening being spaced above the rear edges of said wings whereby said slurry moves outwardly in said fissures as they are formed by said wings and the soil raised by said wings is free to fall after said wings have passed and said slurry has been placed.

* * * * *